(12) United States Patent
Greguitch et al.

(10) Patent No.: US 6,564,540 B2
(45) Date of Patent: May 20, 2003

(54) BRACELET COMPRISING REMOVABLE LINKS

(75) Inventors: Ivan Greguitch, Neuchatel (CH); Antoine Dubois, Villiers-le-Lac (FR)

(73) Assignee: TAG-Heuer SA, Marin (CH)

( * ) Notice: Subject to any disclaimer, the term of this patent is extended or adjusted under 35 U.S.C. 154(b) by 0 days.

(21) Appl. No.: 10/003,902

(22) Filed: Oct. 25, 2001

(65) Prior Publication Data

US 2002/0040573 A1 Apr. 11, 2002

Related U.S. Application Data

(63) Continuation-in-part of application No. PCT/CH00/00150, filed on Mar. 16, 2000.

(30) Foreign Application Priority Data

Apr. 29, 1999 (CH) .............................................. 786/99

(51) Int. Cl.$^7$ ................................................ F16G 13/08
(52) U.S. Cl. ................................... 59/80; 59/78; 59/82
(58) Field of Search ............................. 59/78, 80, 81, 59/82

(56) References Cited

U.S. PATENT DOCUMENTS

| 4,089,161 | A | * | 5/1978 | Aoki ............................... 59/80 |
| 5,038,557 | A | * | 8/1991 | Otsuki et al. ................... 59/80 |
| 5,197,274 | A | * | 3/1993 | Braun ............................. 59/78 |
| 6,026,637 | A | * | 2/2000 | Dombre et al. ................. 59/80 |
| 6,098,394 | A | * | 8/2000 | Hashimoto et al. ............ 59/80 |
| 6,318,064 | B2 | * | 11/2001 | Vandini ......................... 59/80 |

FOREIGN PATENT DOCUMENTS

| CH | 269271 | * | 5/1951 |
| CH | 661185 | | 7/1987 |
| EP | 884007 | | 12/1998 |
| FR | 2693355 | | 1/1994 |
| GB | 2214778 | | 9/1989 |

* cited by examiner

Primary Examiner—David Jones
(74) Attorney, Agent, or Firm—Pearne & Gordon LLP

(57) ABSTRACT

Bracelet comprising a plurality of rows of links, each row of links comprising at least two links traversed by a rod engaged in at least one link of the next row, so as to join both rows in an articulate manner. The rod is constituted of a pin and a head screwed in an opening tapped in the pin. The next row of links can be disassembled by removing first the left link, by unscrewing the head, then by removing the right link with the pin.

20 Claims, 1 Drawing Sheet

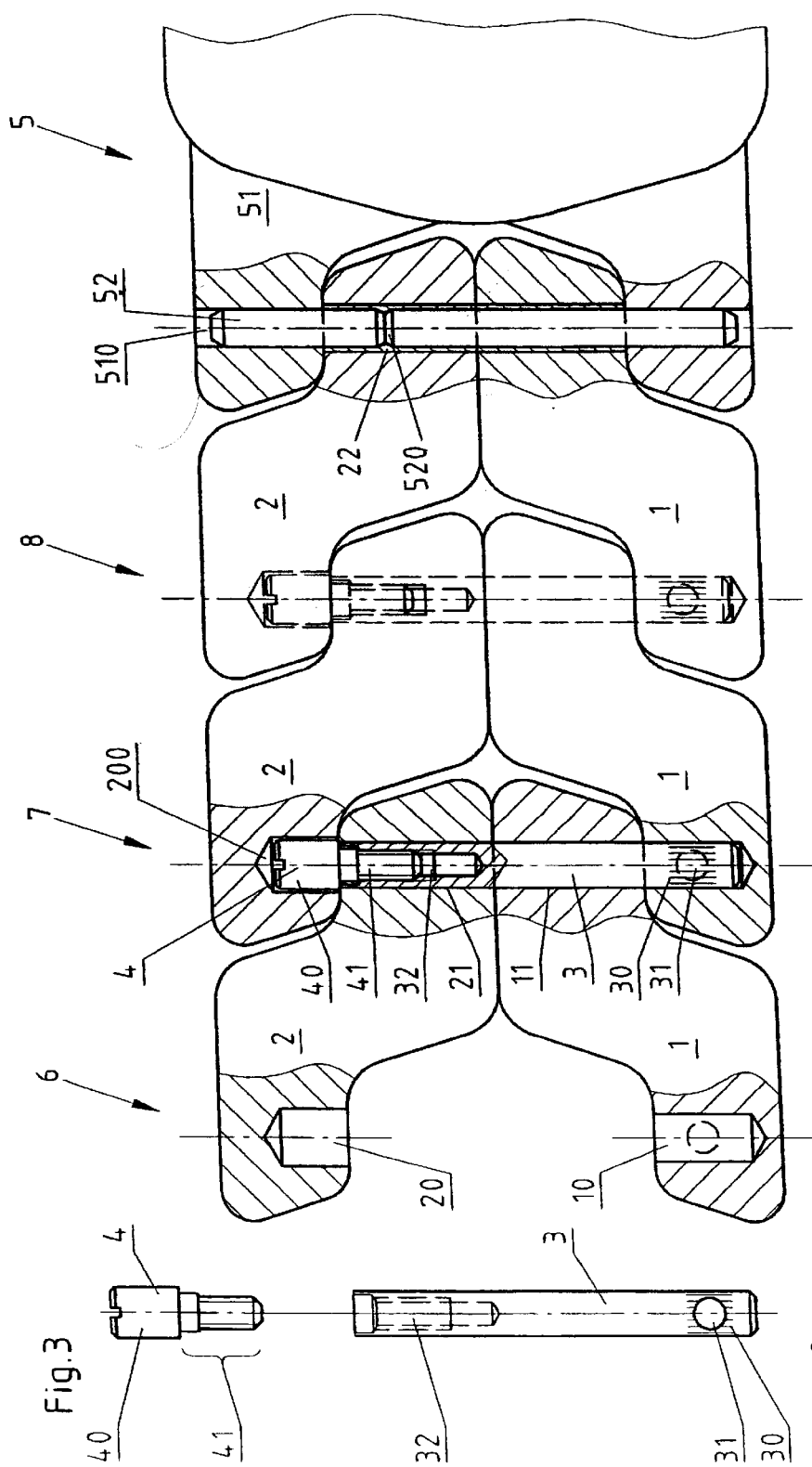

BRACELET COMPRISING REMOVABLE LINKS

This application is a continuation-in-part of application PCT/CH00/00150 filed on Mar. 16, 2000, the contents of which are hereby incorporated by reference. This application further claims the priority of application CH0786/99, filed on Apr. 29, 1999.

1. FIELD OF THE INVENTION

The present invention concerns a bracelet, notably a watchband or watch bracelet, comprising removable links.

2. RELATED ART

Different kinds of bracelets formed of rows comprising each several links joined to the next row by rods are known. The diameter of these bracelets can generally be adapted to the wearer's wrist by removing one or several rows of links.

Patent CH676781 (Stelux) for example describes a bracelet formed of rows of links joined by pins provided with a ring groove. Certain pins can be removed by a screw perpendicular to the pin. The screws are visible from the outside, which is hardly aesthetic and can prove uncomfortable for the wearer of the bracelet.

Patent application GB2214778 describes a watch bracelet in which the rows of links are joined by pins set in a marginal link and engaged freely in a blind hole of the symmetrical link. The bracelet is assembled only when the last link has been blocked by the insertion of a special pin. In this construction, the necessary play for articulating the links is added up at each row, so that the bracelet could break up.

Patent application WO89/08997 (Citizen Watch) describes a bracelet whose rows of successive links are joined by pins invisible from the outside. The pin joining each row comprises a flattening which enables a link to be removed from each row by rotating it by 90°, the other link of the same row being thus disengaged by pulling it in the direction of the pin. This solution requires an accurate manufacture of the pins and of the lodgings for the pins in the links.

FR-A1-2693355 describes a bracelet with articulated links comprising several rows of two links, said rows being articulated with each other by means of pins inserted in blind holes. The aim of this document is to avoid all the screws at the articulation between links. This bracelet suffers from the same drawbacks as the bracelet described in GB2214778.

CH-A5-665185 describes a watch bracelet in which the links are articulated by means of dissociable rods. The rods are visible from the outside, so that this bracelet suffers from the same drawbacks as the bracelet described in CH676781.

Other known systems use spring pins, which however have the inconvenience of a limited reliability.

It is a purpose of the present invention to propose a new type of bracelet with removable links that is different from existing bracelets.

Another purpose is to propose a bracelet with removable links that does not have the inconveniences of the bracelets of the prior art.

3. BRIEF SUMMARY OF THE INVENTION

These claims are achieved according to the invention by a bracelet comprising a plurality of rows of links, each row of links comprising at least two links, the at least two links are in a row of links traversed by a rod engaged in at least one link of a next row, to join the row of links and the next row in an articulate manner. The links of the next row cover a projecting end of the rod. The rod has several dissociable parts and the row is removable by separating the rod.

The one skilled in the art will realise that these characteristics make it possible to produce, at a low cost, a bracelet with removable links that is reliable, strong and whose link fastening system is practically invisible from the outside.

The invention applies for example to the making of watch bracelets with metallic links or to any other type of bracelet of adjustable length.

4. BRIEF DESCRIPTION OF THE DRAWINGS

The invention will be better understood with reference to the description given as example and illustrated by the attached drawings in which:

FIG. 1 shows a top view, partially in cross section, of several rows of links of the bracelet laid flat, the rows being joined in a preferred embodiment of the invention.

FIG. 2 shows in detail a pin according to a preferred embodiment of the invention.

FIG. 3 shows in detail a pin head according to a preferred embodiment of the invention.

5. DETAILED DESCRIPTION OF AN EMBODIMENT OF THE INVENTION

FIG. 1 shows a top view of several rows of links of a watch bracelet according to the invention. Each row 6, 7, 8 is constituted in this example of a right link 1 and a symmetrical left link 2. The invention is however not restricted to bracelets comprising two links per row; it would be possible for example to insert one or several intermediary links between the marginal links 1 and 2. Similarly, the invention is not limited to the particular illustrated shape of the links.

The links 1 and 2 of each row are maintained one against the other between a portion of the links of the next row. A cylindrical rod 3, 4, traverses all the links 1, 2 of the row through an opening 11, 21 having a diameter slightly superior to that of the rod, so as to allow a rotation without play of the rows of links in relation to each other. A first extremity of the rod, visible more specifically in FIG. 2, is fastened by setting in a blind hole 10 of a link of the next row, in this example a right link 1. The portion of the rod set in the hole 10 comprises preferably a flattening or a blind hole 31 allowing for an easier setting effected for example by a stroke of the centre punch delivered on the inner side of the bracelet and to prevent any rotation of the rod around its own axis. The rod preferably further comprises a peripheral grooving 30 in order notably to hold it provisionally during assembly, before setting.

Other methods for fastening the cylindrical rod 3 in the blind hole 10 can be used in the framework of this invention. The rod could be for example also be screwed in a tapped hole or fastened by welding, gluing or wedging, these solutions having furthermore the advantage of not leaving any trace of setting on the outside of the bracelet. In a variation of the invention, one could also use rods made of shape memory alloys inserted at high temperature in the blind hole. In an additional variation, the rod would be freely engaged in the blind hole 10, without any specific fastening means. One will use in this variation a rod 3 fitted with a head engaged in the blind hole 10 of a diameter superior to that of the opening 11, 21, the head being removable, for example unscrewable.

The second extremity of the rod 3, 4 is constituted of a head 4 that can be dissociated from the remainder 3 of the rod 3, 4 and engaged freely in an opening 200 in another link of the next row, in this example a left link 2. The rod 3, 4 is thus constituted of a pin 3 and a head 4, these two parts being separable. In the figure, the pin 3 is provided with a tapped lodging 32 in which a threaded portion 41 of the head 4 can be screwed. The head furthermore comprises a portion 40 of a wider diameter, SO that the links 1, 2, traversed by the pin 3 can be removed only by unscrewing the head 4 so as to dissociate the rod 3, 4.

The length of the pin 3 is preferably chosen so as to allow a slight play between the head 4 and the part of the link 2 facing it. The successive link rows are thus not too compressed and can swivel without difficulties and without damaging each other. In the same manner, a play is provided between the peripheral surface of the head 4 and the sides of the opening 200 in which the head is lodged. In this manner, the head 4 is not led into rotation by the swivelling of the links 1, 2 and does not risk being accidentally unscrewed. Preferably, a Teflon screw with a high coefficient of friction will be used in order to further limit the risk of accidental unscrewing; an adhesive point could also be applied on the threaded portion 41. Finally, the depth of the opening 41 is chosen in a manner as to avoid complete unscrewing of the head 4 without removing the link 2 where it is lodged. The possible maximal play of each row is thus determined by the depth of the openings 200, so that the play in each row does not add up if the heads are screwed and only partly if the heads begin to become unscrewed.

Although the rod 3, 4 in the example described consists of a pin 3 and a head 4 screwed into an opening 32 tapped in this pin, the one skilled in the art will understand that other types of removable pins can be used in the framework of this invention. The head 4, for example, could be constituted by a cap provided with a tapping screwed on an external threading of the rod 3. In one variation, the rod could consist of two portions of sensibly similar length screwed one to the other. One could also use heads equipped with notched screws that snap in the pins 3 for a determined tightening of the screw. Other types of links removable in two or more parts can easily be conceived by one skilled in the art in the framework of this invention.

The last row 8 of the links (on the right in FIG. 1) is fastened onto the clasp 5 or the watch case by a clasping mechanism that is accessible from outside. In the example shown, the clasping mechanism consists of a pin 52 wedged in an opening 510 traversing the last two links 1, 2 and the horns 51 of the clasp. The pin 52 comprises a notch constituted by a ring groove 520 corresponding to a rib 22 in one of the links 1 or 2. The insertion of the rib 22 into the groove 520 allows the longitudinal position of the pin to be fixed. The pin is preferably pressed in the opening 510 by means of suitable pliers of a known type; an audible click indicates the correct insertion of the rib 22 into the groove 520.

Other systems for fastening the last row 8 of links to the clasp 5 can be conceived in the framework of this invention. For example, the last links 1, 2 could be fastened to the clasp 5 or to the watch case by a dissociable rod 3, 4 similar to that used to join the other rows but accommodated in a traversing hole, so that the screw slot can be accessed with a screwdriver. This variation offers the advantage of being able to be disassembled with the help of a screwdriver only, but it has the disadvantage of possibly falling apart if the screw is loosened. In the same manner, the row 8 could be fastened by a simple screw engaged in a tapped hole across one of the horns of the clasp 5.

The diameter of the bracelet can be adjusted by first disassembling the fastening system 52 of the last row to the clasp, by means of an adapted punch or pliers. The left link 2 of the last row can then be very easily disassembled by pulling it out in its own plane, thus revealing the head 4 of the first rod 3, 4. This head can be unscrewed by means of a screwdriver so as to separate the rod in two parts 3, 4. The right link 1 of the last row can then be removed with the pin 3 immovably attached to it by pulling it out in its own plane. It is then possible to remove the left link 2 of the penultimate row, and so forth.

Preferably only part of the rows of links of the bracelet is joined by dissociable rods 3, 4. The other links are thus not removable so that the range of adaptation of the bracelet is restricted to the dimensions that are useful in practice. This allows, on the one hand, to use construction rods that are more economical for joining the non removable rows and, on the other, to limit further the risk of adding the play between successive rows.

What is claimed is:

1. A bracelet comprising a plurality of rows of links, each row of links comprising at least two links, said at least two links comprised in a row of links being traversed by a rod engaged in at least one link of a next row to join said row of links and said next row in an articulate manner, wherein said links of said next row cover a projecting end of said rod, said rod comprising several dissociable parts, said row being removable by separating said rod.

2. The bracelet according to claim 1, said rod comprising a pin traversing said at least two links and a head removably fastened to an extremity of said pin.

3. The bracelet according to claim 2, wherein the other extremity of said pin is immovably attached to one said link of said next row.

4. The bracelet according to claim 3, wherein the diameter of said head is greater than the diameter of the body of said pin, so that said head can restrict the play of said row along said pin.

5. The bracelet according to claim 4, said links of said next row comprising a blind hole, said head being lodged in said blind hole.

6. The bracelet according to claim 5, wherein the depth of said blind hole prevents said head from being unscrewed without removing said link of the next row.

7. The bracelet according to claim 5, further comprising a radial play between said blind hole and said head.

8. The bracelet according to claim 2, wherein said pin is provided with a tapped bore in which said head is screwed.

9. The bracelet according to claim 1, said parts of said dissociable rod being screwed together.

10. The bracelet according to claim 9, said head comprising a threaded portion covered with Teflon.

11. The bracelet according to claim 9, said head being glued to said pin.

12. The bracelet according to claim 1, comprising several rows of links joined by said dissociable rods.

13. The bracelet according to claim 12, comprising several rows of links joined by rods, and only part of said rods being dissociable.

14. The bracelet according to claim 1, wherein a last row of links is assembled by means of a fastening system accessible from the outside of the bracelet.

15. The bracelet according to claim 14, said last row of links being assembled by means of a notched pin.

16. The bracelet according to claim 15, wherein said notched pin comprises a portion of a diameter different from that of the rest of the pin.

17. The bracelet according to claim 1, said rows being constituted of two symmetrical links.

18. A watch fitted with the bracelet according to claim 1.

19. A bracelet comprising a plurality of rows of links, each row of links comprising at least two links traversed by a rod engaged in at least one link of the next row, so as to join the two rows in an articulate manner, wherein said rod is accessible only by removing a link of said next row, said rod comprising several dissociable parts, said parts being screwed together said rod comprising a pin traversing said at least two links and a head removably fastened to an extremity of said pin, the diameter of said head being superior to the diameter of the body of said pin, said head being lodged in a blind hole of one said links of said next row said row being removable by separating said rod.

20. A bracelet comprising a plurality of rows of links, each row of links comprising at least two links, said at least two links comprised in a row of links being traversed by a rod engaged in at least one link of a next row, to join said row of links and said the next row in an articulate manner, wherein two extremities of said rod are lodged into two blind holes comprised in said at least two links of said next row, said rod comprising several dissociable parts, said row being removable by separating said rod.

* * * * *